United States Patent
Seki et al.

(10) Patent No.: US 6,789,305 B2
(45) Date of Patent: Sep. 14, 2004

(54) LINEAR MOTOR COILS ASSEMBLY AND MANUFACTURING METHOD THEREOF

(75) Inventors: Yoichi Seki, Fukui (JP); Taro Hasegawa, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 10/680,131

(22) Filed: Oct. 8, 2003

(65) Prior Publication Data

US 2004/0070288 A1 Apr. 15, 2004

Related U.S. Application Data

(62) Division of application No. 09/830,409, filed as application No. PCT/JP00/07669 on Oct. 30, 2000, now Pat. No. 6,661,124.

(51) Int. Cl.⁷ .............................................. H02K 15/16
(52) U.S. Cl. ............................ 29/596; 29/605; 29/606; 310/12; 310/13
(58) Field of Search ............................ 310/12, 13, 201, 310/208, 57, 58, 60 R, 60 A; 336/60; 29/596, 605, 606

(56) References Cited

U.S. PATENT DOCUMENTS

| | | | | |
|---|---|---|---|---|
| 3,488,532 A | * | 1/1970 | Anderson et al. | 310/58 |
| 3,913,045 A | * | 10/1975 | Von Starck | 336/60 |
| 4,246,694 A | * | 1/1981 | Raschbichler et al. | 29/596 |
| 4,310,694 A | * | 1/1982 | Ehrenfreund | 564/442 |
| 4,749,921 A | | 6/1988 | Chitayat | 310/12 |
| 4,906,878 A | * | 3/1990 | Twaalfhoven et al. | 310/12 |
| 5,323,079 A | * | 6/1994 | Nieves et al. | 310/213 |
| 5,519,266 A | | 5/1996 | Chitayat | 318/135 |
| 5,783,877 A | | 7/1998 | Chitayat | 310/12 |
| 5,910,691 A | * | 6/1999 | Wavre | 310/12 |
| 6,005,310 A | * | 12/1999 | Mosciatti et al. | 310/12 |
| 6,313,556 B1 | * | 11/2001 | Dombrovski et al. | 310/91 |

FOREIGN PATENT DOCUMENTS

| | | |
|---|---|---|
| JP | 50-52416 | 5/1975 |
| JP | 50-93204 | 8/1975 |
| JP | 63-18956 | 1/1988 |
| JP | 5-83923 | 4/1993 |
| WO | WO 01/31768 | 5/2001 |

* cited by examiner

Primary Examiner—Thanh Lam
Assistant Examiner—Leda Pham
(74) Attorney, Agent, or Firm—McDermott Will & Emery LLP; Paul Devinsky (57) ABSTRACT

In a linear motor coil assembly (12), and a method for manufacturing the same, a plurality of coils (14) are arranged in a line in a direction of movement and have respective coil axes perpendicular to the direction of movement of the motor. A flat cooling tube (20) is arranged to meander inside the plurality of coils. The cooling tube has a cross section elongated in a direction parallel to the coil axes, and a plurality of clearance holes (25) through which coolant flows are formed inside the cooling tube. The cooling tube has interleaved folds at least equal in number to the number of coils. The coils being fitted into these folds. At the time of manufacture of the coil assembly, the coils are wound around cores that are divided for each coil, and the cores are inserted into the folds of the cooling tube.

4 Claims, 8 Drawing Sheets

FIG. 11

LINEAR MOTOR COILS ASSEMBLY AND MANUFACTURING METHOD THEREOF

This application is a divisional of application Ser. No. 09/830,409 filed Apr. 27, 2001 now U.S. Pat. No. 6,661,124 which is a 371 Application of International Application PCT/JP00/07669 filed Oct. 30, 2000.

FIELD OF THE INVENTION

The present invention relates to a linear motor for generating linear movement. More particularly, the present invention relates to a linear motor coil assembly having a plurality of coils arranged in a line in the direction of linear motion.

BACKGROUND ART

Machine tools are known that use a linear motor to cause a table to move linearly at high speed and to position the table with high precision. Recently, linear motors have become more widely used. Such motors do not a require conveying means such as a feed screw. A linear motor may be used in a machine tool when it is needed to generate a large thrust, and where more compact structures are needed. However, because of their compact size, linear motors generate more heat than rotary motors. The temperature rise associated with a linear motor may limit its rated thrust, and lower its mechanical positioning accuracy. In many cases, linear motors are encapsulated in a cover in order to prevent magnetic dust from infiltrating into the linear motor. Because of this encapsulation, insufficient natural cooling of the linear motor may result, making effective cooling of the linear motor an important consideration.

Figure 9:
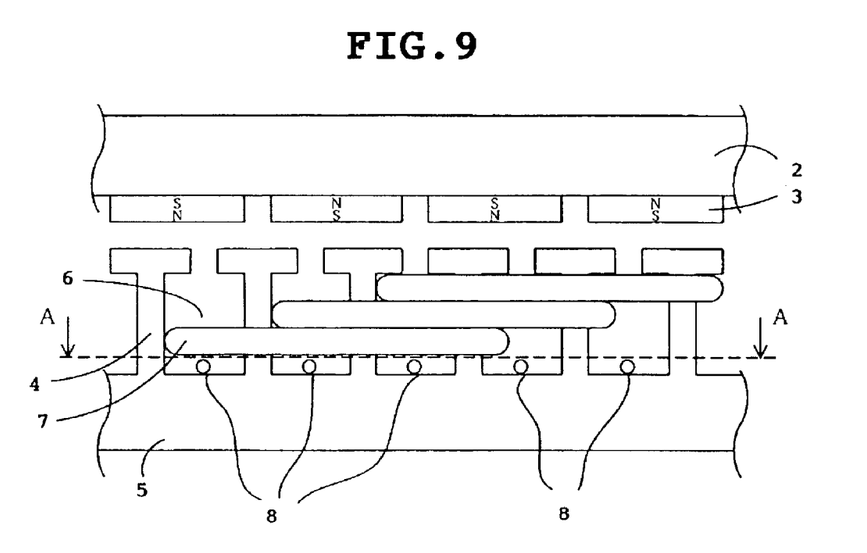
FIG. 9 is a plan view of a linear motor according to the background art.
Figure 10:
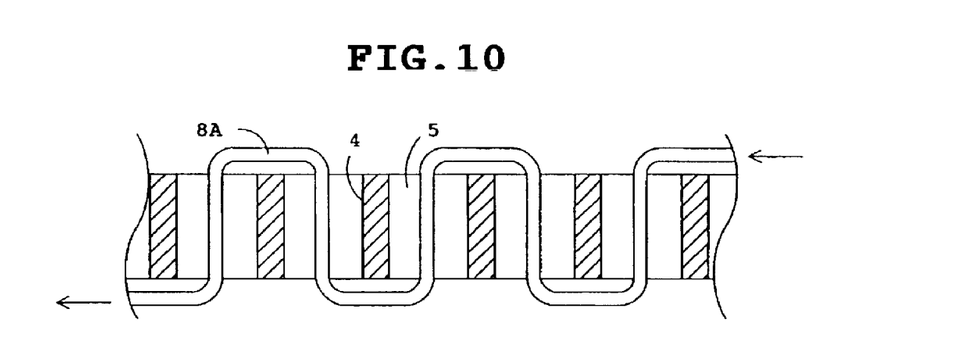
FIG. 10 is a cross sectional view of one example of a cooling tube taken along line A—A in FIG. 9.
Figure 11:
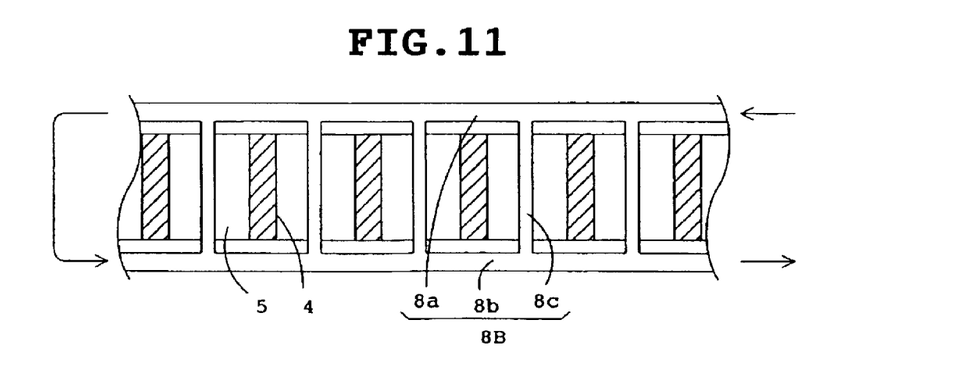
FIG. 11 is a cross sectional view of another example of a cooling tube taken along line A—A in FIG. 9.

Japanese Laid-Open Patent Application 63-18956 discloses a cooling apparatus for a linear motor. The motor is equipped with a cooling tube at the bottom of a groove formed between adjoining pole teeth. This linear motor cooling tube will now be described in detail below with reference to FIG. 9, FIG. 10 and FIG. 11. A plurality of permanent magnets 3 having alternating magnetic poles are fixed in a line on the lower surface of a carrier 2 in the direction of movement. A fixed armature is made up of a plurality of T-shaped pole teeth 4, a base 5 connecting the pole teeth, and a coil 7 wound around the teeth 4. As clearly shown in FIG. 9, cooling tubes 8 are provided, one each at the bottom of grooves 6 formed by adjoining pole teeth 4. The cooling tubes 8 comprise, for example, a tube 8A which meanders around the grooves 6, as shown in FIG. 10. A coolant, in gas or liquid form, circulates in the pipe 8A. As shown in FIG. 11, the cooling tubes 8, may comprise stair-shaped pipes 8B. The pipes 8B are equipped with headers 8a and 8b which extend parallel to a moving direction, opposite with respect to the base 5, and a bridging section 8c, bridging the headers 8a and 8b. The coolant is introduced from one end of the header 8a, passes through the bridging section 8c and is discharged from one end of the header 8b.

SUMMARY OF THE INVENTION

An object of the present invention is to provide a linear motor coil assembly that efficiently dissipates heat generated in the coil.

Another object of the present invention is to provide a compact linear motor coil assembly.

Still another object of the present invention is to provide a simple method of manufacturing a linear motor coil assembly, having a high cooling efficiency.

These and other objects are achieved by providing, according to the present invention, a linear motor coil assembly for developing linear motion. The coil assembly comprises a plurality of coils arranged in a line in the direction of movement, respective coil shafts being arranged perpendicular to the direction of movement, and a flat cooling pipe, having a cross section that is elongated in a direction parallel to the coil shafts and having folds into which the coils can be engaged, the cooling pipe meandering inside the plurality of coils.

The flat cooling pipe preferably has a plurality of clearance holes for passing coolant formed in a direction parallel to the coil shafts.

Alternatively, the flat cooling pipe for passing coolant may be formed by aligning and attaching a plurality of round pipes in a direction parallel to the coil shafts.

The flat cooling tube preferably has interleaved folds at least equal in number to the number of coils.

The linear motor coil assembly may also include cores, divided for each coil, around which the coils are wound.

According to the present invention, there is also provided a method of manufacturing a linear motor assembly for developing linear motion, comprising the steps of providing cores divided for each magnetic pole, winding coils around the respective cores, providing a flat cooling pipe having interleaved folds, at least equal in number to the number of coils, into which the coils may be engaged, fitting the core into the folds, and arranging the cores in a line on a base plate.

Other objects and novel features will become apparent upon consideration of the following description.

PREFERRED EMBODIMENT OF THE INVENTION

A linear motor coil assembly according to an embodiment of the present invention will now be described with reference to FIG. 1, FIG. 2, FIG. 3 and FIG. 4.

Figure 1:
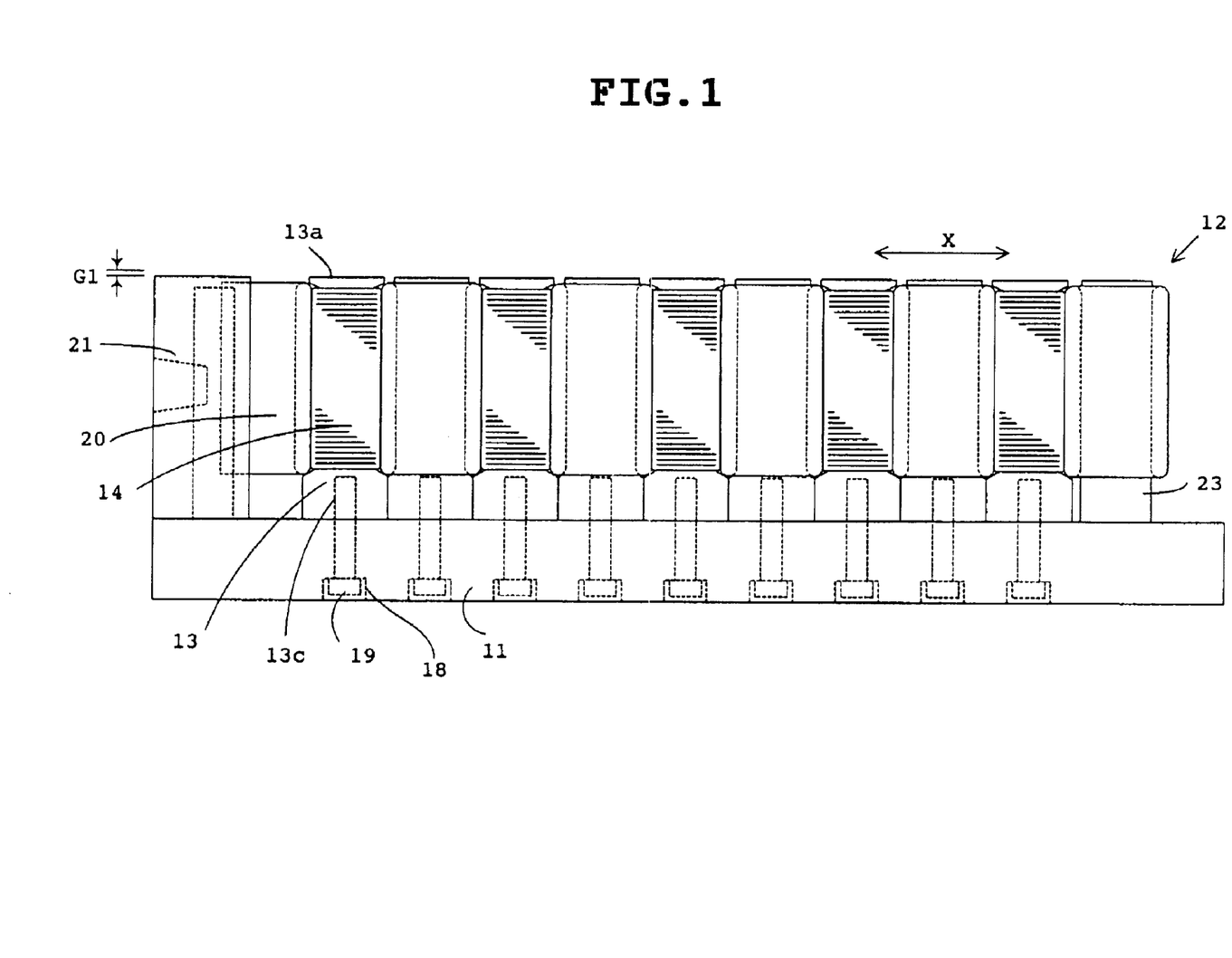
FIG. 1 is a front elevation depicting an embodiment of a linear motor coil assembly of the present invention.
Figure 2:
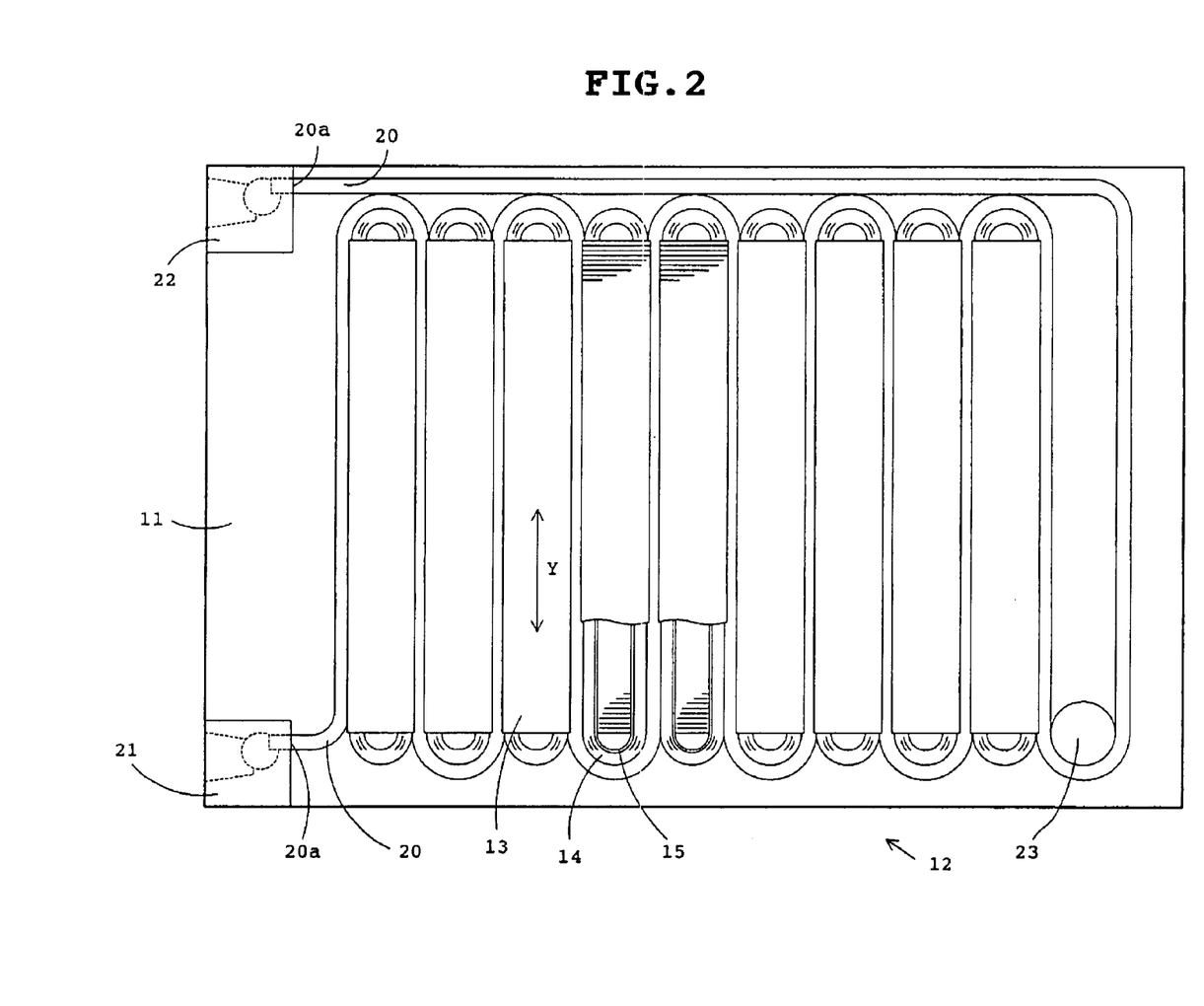
FIG. 2 is a plan view depicting the coil assembly of FIG. 1.
Figure 3:
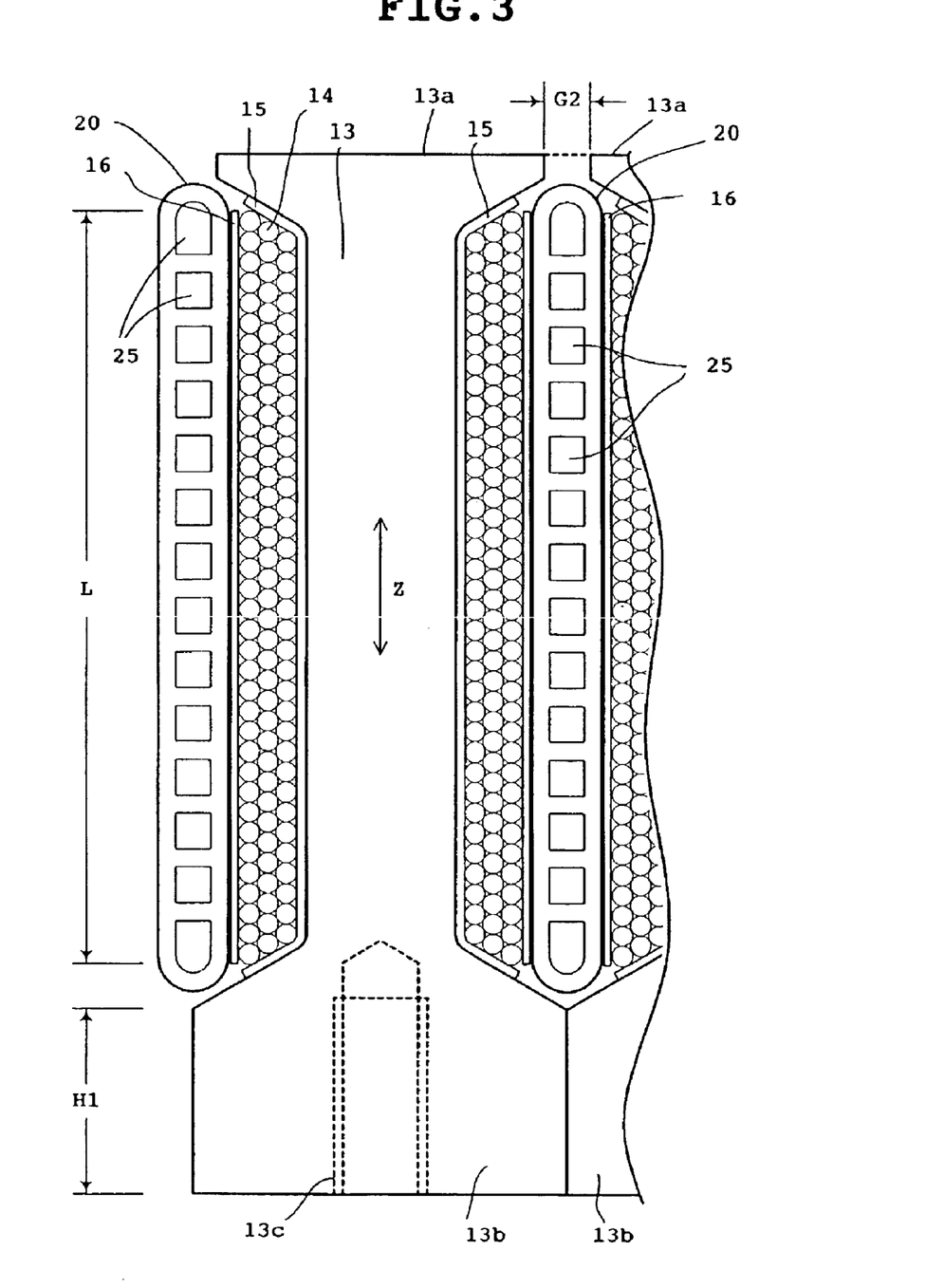
FIG. 3 is a cross sectional drawing showing a coil and a cooling tube in FIG. 1 in magnified form.
Figure 4:
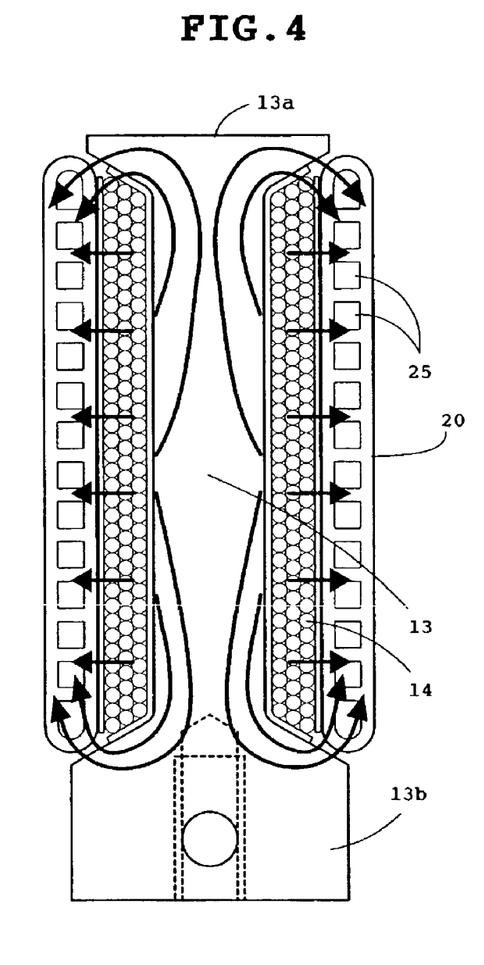
FIG. 4 is a cross sectional drawing showing conveyance of the heat generated in the coils to the cooling tube.

A linear motor coil assembly 12 for developing motion in the direction of a horizontal linear axis X has a base plate 11, cores 13 having coils 14 mounted thereon. The coil assembly 12 may constitute either a mover or a stator. Reference numeral G1 in FIG. 1 represents a gap formed between a stator and a mover. The base plate 11 has a horizontal upper surface. The cores 13 divided for each magnetic pole and aligned in a line in the direction of the linear axis X are attached to the upper surface of the base plate 11 using screws 19. A plurality of holes 18 for the screws 19 are formed in the base plate. The cores 13 are preferably formed by laminating silicon-steel plates and welding or gluing them together. As illustrated in FIG. 2, the cores 13 extend parallel to each other in a horizontal direction Y perpendicular to the linear axis X. As illustrated in FIG. 3, a gap G2 is formed between pole faces 13a of adjoining cores 13. In order to make the gap G2 as small as possible, the pole faces 13a of the cores 13 protrude in the direction of the linear axis X. The size of the gap G2 is preferably maintained at a value about double the gap G1. A small gap G2 reduces undesirable torque ripple. A yoke section 13b is formed connecting adjoining cores 13, and holes 13c for screws 19 are formed in the yoke section 13b. In the illustrated embodiment, a set of insulators 15, for insulating the coils 14, are inserted into the cores 13. The coils 14 are wound around respective cores 13 via insulators 15, preferably without overlapping. The coil axes Z are parallel to each other, and perpendicular to the linear axis X. The insulators 15 may, for example, be made of compact liquid crystal polymer resin capable of being thinly formed and having high thermal conductivity. As illustrated in FIG. 2, the insulators 15 have a generally U-shaped horizontal cross section, and a set of insulators are fit onto each core 13. Tapered insulators 16 for preventing damage to the finish, e.g., enamel paint, of the coils 14 are preferably wrapped around the outside of the coils 14. A flat cooling tube 20, arranged so as to meander around the inside of the coils 14, is arranged in the direction of the linear axis X. The cooling tube 20 is preferably made of extruded aluminum. The cooling tube 20 is preferably glued to the coils 14, and the insulators 16 improve adherence between the coils 14 and the cooling tube 20. As illustrated in FIG. 3, the cooling tube 20 has a cross section elongated parallel to the coil axes Z, and is arranged higher than the height H1 of the yoke section 13b. The length of the elongated cross section is preferably the same as, or slightly larger than, the length L of the coils 14 in the axial direction. As a result, the cooling tube 20 is glued to almost the entire outer surface of the coils 14, which are a source of heat. A plurality of holes 25, through which coolant flows, are formed in the cooling tube 20 in a direction parallel to the coil axes. Preferably, the cooling tube 20 does not have any branches, which means that no stagnation occurs in the flow of coolant. As shown by the arrows in FIG. 4, heat generated in the coils 14 which is conducted to an outer side is directly cooled by coolant inside the cooling tube 20. Heat conducted from the coils 14 to the cores 13 is transferred through pole surfaces 13a close to the cooling tube 20 and the yoke section 13b to the cooling tube 20.

Figure 5:
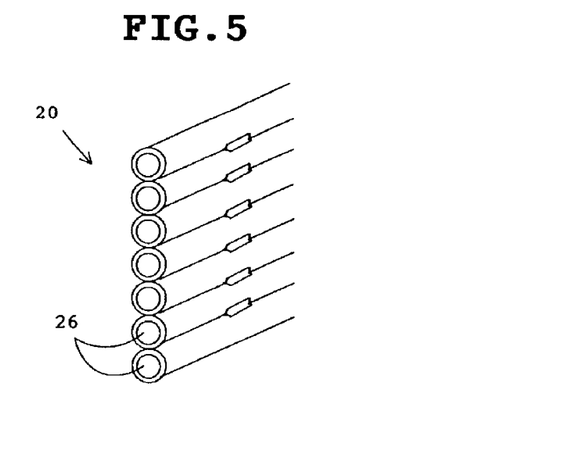
FIG. 5 is a perspective view depicting another embodiment of the cooling tube in FIG. 1.

FIG. 5 illustrates another example of the cooling tube 20. The cooling tube 20 of FIG. 5 has a plurality of round copper pipes arranged parallel to the coil axes Z. Adjoining copper pipes 26 are preferably joined by brazing. The two ends 20a and 20b of the cooling tube 20 are connected to respective manifolds 21 and 22, preferably by welding.

A method of manufacturing a coil assembly according to the present invention will now be described in detail below with reference to FIG. 6A, FIG. 6B, FIG. 6C, FIG. 6D.

Figure 6A:
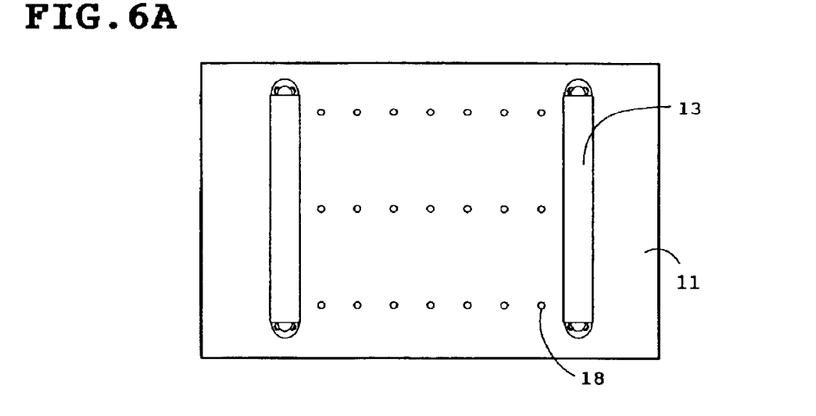
FIG. 6A, FIG. 6B, FIG. 6C and FIG. 6D are plan drawings depicting a method of manufacturing a linear motor coil assembly.
Figure 6B:
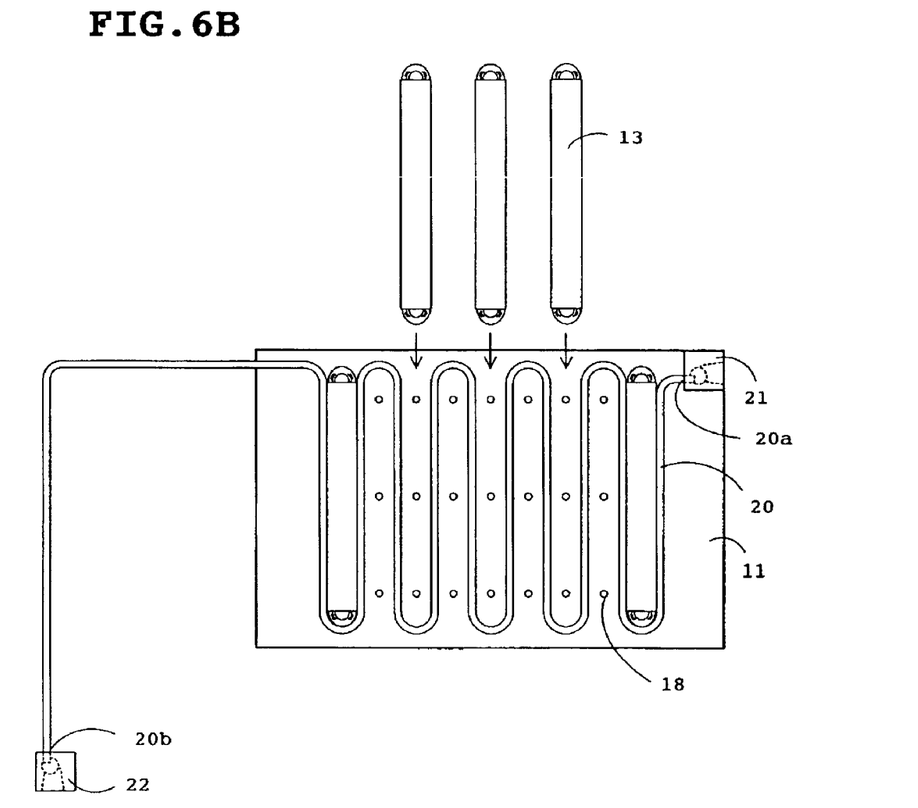
Figure 6C:
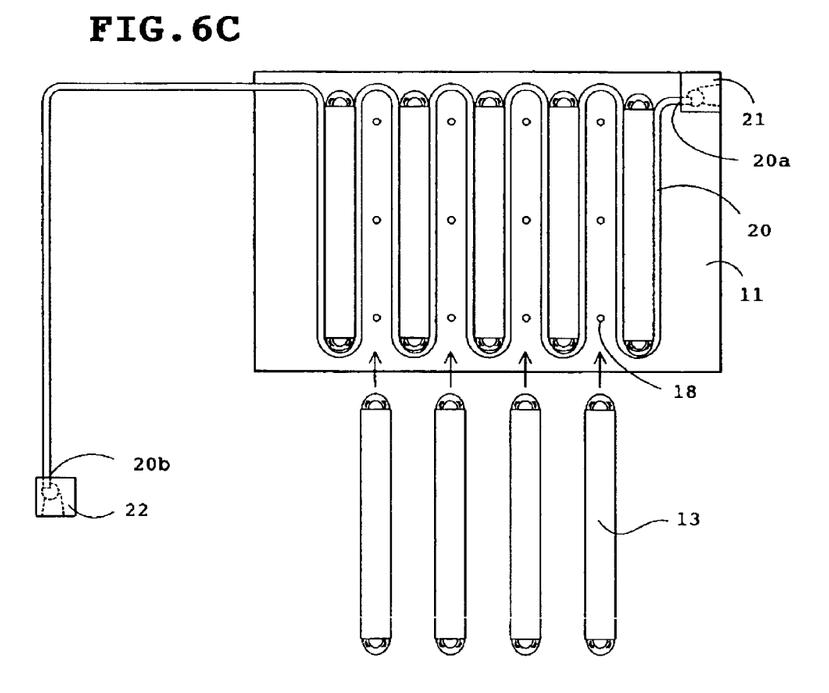
Figure 6D:
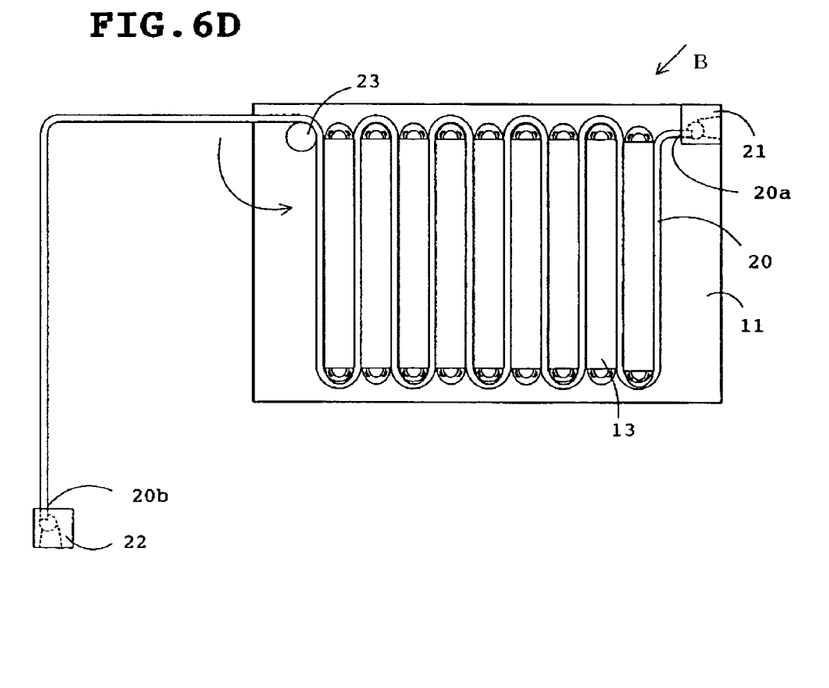
Figure 7:
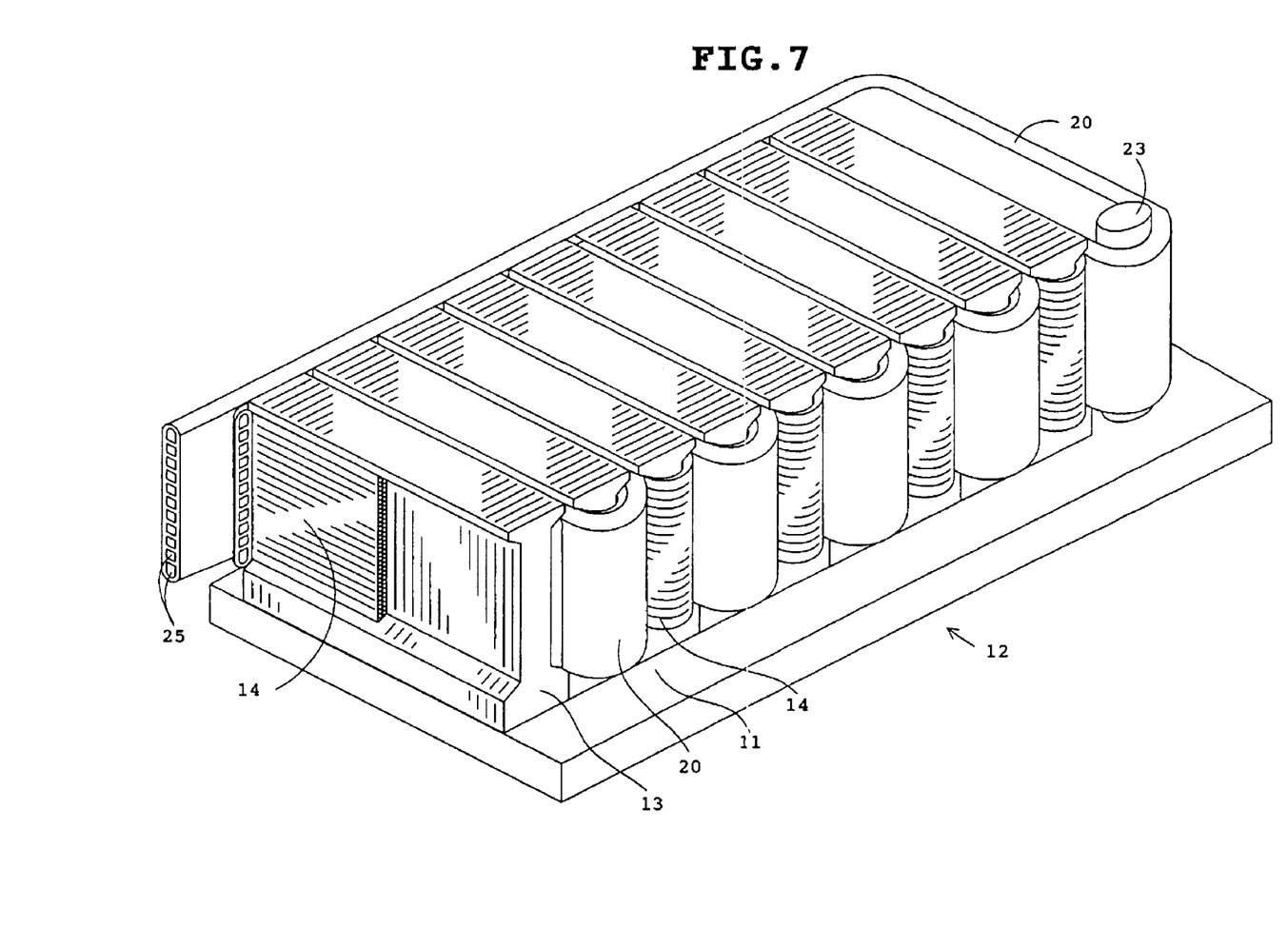
FIG. 7 is a perspective view of a coil assembly viewed in the direction of arrow B in FIG. 6.

As shown in the exemplary embodiment of FIG. 6A, cores at two locations, corresponding to the head and tail of a row of cores are temporarily attached to an upper surface of a base plate 11 using screws 19. In the illustrated embodiment, a row of cores is made up of nine cores 13. The coils 14 are wound around the cores 13 using a coil winding machine. Since the cores are divided for each coil 14, winding of the coils 14 is simple. As shown in FIG. 6B, a flat cooling tube 20 having interleaved folds at least equal in number to the number of coils 14, is provided in the illustrated embodiment a flat cooling tube 20 having nine interleaved folds is provided. The folds of the cooling tube 20 are formed to correspond to the outline of the coils 14, so that the coils 14 fit into the folds. The two ends of the cooling tube 20 are fixed preferably by welding, to elongated holes formed in manifolds 21 and 22. The cooling tube 20 is moved horizontally, and the folds of the cooling tube 20 fit into two coils 14 on the base plate 11. In the illustrated embodiment, three cores 13 are then moved horizontally, and inserted into folds of the cooling tube 20. Then, as shown in FIG. 6C, an odd number, in this case five, cores of the row of cores are arranged on the upper plane of the base plate. Since the cores are inserted in the direction in which the coils are wound, damage to the coils is unlikely. An even number of cores of the core row, in this case four, are then moved horizontally and inserted into folds of the cooling tube 20. One of the manifolds 21 is fixed to one end of the base plate 11. All of the cores 13 are then fixed to the base plate 11 using screws 19. As shown in FIG. 6D and FIG. 7, a cylindrical member 23 is vertically attached to the other end of the base plate 11. The cooling tube 20 remaining at the other end of the base plate 11 is bent around the center of the cylindrical member 23. Then, the other manifold 22 is fixed to one end of the base plate 11.

After lead wires of the coils 14 have been located on the outer side of the base plate, the coil assembly 12 may be covered with a box-shaped frame. The frame is filled with insulating resin until the pole faces 13a of the cores 13 are covered. The fixed resin compact may then be finished to the specified dimensions so as to expose the pole faces 13a.

Figure 8:
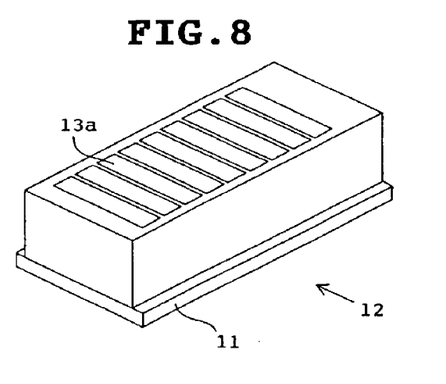
FIG. 8 is a perspective view showing the coil assembly of FIG. 1 covered by an insulating resin.

FIG. 8 depicts the coil assembly covered with the insulating resin as described above. Where the insulating resin sufficiently permeates into the coil assembly 12, there is no need for the insulators 16.

The illustrated embodiment has been selected simply to describe the essence and practical application of the present invention, the scope of which is defined solely by the appended claims.

What is claimed is:

1. A method of manufacturing a linear motor coil assembly for developing linear motion, comprising the steps of:

providing a plurality of cores divided for each magnetic pole;

winding coils around the respective cores;

providing a cooling tube having a plurality of interleaved folds into which said coils are adapted to engage; and fitting the coils into the folds.

2. The method of manufacturing a linear motor coil assembly according to claim 1, wherein the step of fitting includes fitting the coils into the folds in the direction in which the coils are wound.

3. The method of manufacturing a linear motor coil assembly according to claim 1, wherein each coil has an associated coil axis and the cooling tube has a cross section elongated in a direction parallel to the coil axes.

4. The method of manufacturing a linear motor coil assembly according to claim 1, wherein the cooling tube has interleaved folds at least equal in number to the number of coils.

* * * * *